US009470962B2

(12) United States Patent
Kimura

(10) Patent No.: US 9,470,962 B2
(45) Date of Patent: Oct. 18, 2016

(54) DISCHARGE LAMP DRIVING DEVICE, PROJECTOR, AND METHOD FOR DRIVING A DISCHARGE LAMP

(71) Applicant: SEIKO EPSON CORPORATION, Tokyo (JP)

(72) Inventor: Keishi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 68 days.

(21) Appl. No.: 14/529,722

(22) Filed: Oct. 31, 2014

(65) Prior Publication Data
US 2015/0055097 A1 Feb. 26, 2015

Related U.S. Application Data

(63) Continuation of application No. 13/313,385, filed on Dec. 7, 2011, now Pat. No. 8,911,095.

(30) Foreign Application Priority Data

Jan. 11, 2011 (JP) .................................. 2011-002939

(51) Int. Cl.
G03B 21/20 (2006.01)
H05B 41/288 (2006.01)
G03B 35/16 (2006.01)
H04N 9/31 (2006.01)
(Continued)

(52) U.S. Cl.
CPC ....... *G03B 21/2053* (2013.01); *G02B 27/2264* (2013.01); *G03B 35/16* (2013.01); *H04N 9/3155* (2013.01); *H04N 13/0438* (2013.01); *H04N 13/0459* (2013.01); *H04N 13/0497* (2013.01); *H05B 41/16* (2013.01); *H05B 41/24* (2013.01); *H05B 41/2887* (2013.01); *Y02B 20/202* (2013.01)

(58) Field of Classification Search
CPC .......... G02B 27/2264; G03B 21/2053; G03B 35/16; H04N 13/0438; H04N 13/0459; H04N 13/0497; H04N 9/3155; H05B 41/16; H05B 41/24; H05B 41/2887; Y02B 20/202
See application file for complete search history.

(56) References Cited

U.S. PATENT DOCUMENTS

2005/0067979 A1* 3/2005 Haruna .............. H05B 41/2926 315/291
2007/0097332 A1 5/2007 Kubo
(Continued)

FOREIGN PATENT DOCUMENTS

CN 101400204 A 4/2009
JP A-2006-120654 5/2006
(Continued)

*Primary Examiner* — Sultan Chowdhury
*Assistant Examiner* — Magda Cruz
(74) *Attorney, Agent, or Firm* — Oliff PLC

(57) ABSTRACT

A discharge lamp driving device includes: a direct-current power supply section (a power supply section) that controls a current of power to be supplied to a discharge lamp from input power, and outputs the current; a voltage detecting section that detects a lamp voltage (a drive voltage) of the discharge lamp; and a control section that controls a modulation factor of a lamp current (a drive current) on which amplitude modulation has been performed, the lamp current (the drive current) which is supplied to the discharge lamp from the direct-current power supply section (the power supply section), in accordance with the detected lamp voltage (drive voltage) of the discharge lamp.

16 Claims, 6 Drawing Sheets

(51) Int. Cl.
*H04N 13/04* (2006.01)
*G02B 27/22* (2006.01)
*H05B 41/16* (2006.01)
*H05B 41/24* (2006.01)

(56) References Cited

U.S. PATENT DOCUMENTS

2007/0164687 A1* 7/2007 Watanabe ............ H04N 9/3114
　　　　　　　　　　　　　　　　　　　　　　315/291
2007/0228998 A1* 10/2007 Takezawa ............ H01J 61/025
　　　　　　　　　　　　　　　　　　　　　　315/291
2008/0198337 A1   8/2008 Kitagawa
2009/0085495 A1   4/2009 Yamauchi et al.
2010/0194302 A1   8/2010 Nakada et al.
2011/0210680 A1*  9/2011 Yamamoto ......... H05B 41/2888
　　　　　　　　　　　　　　　　　　　　　　315/209 R
2011/0221355 A1   9/2011 Goto et al.

FOREIGN PATENT DOCUMENTS

JP　　　A-2007-121971　　　5/2007
JP　　　A-2008-159470　　　7/2008
JP　　　A-2009-031523　　　2/2009
WO　　WO 2005/081589 A1　9/2005

* cited by examiner

DISCHARGE LAMP DRIVING DEVICE, PROJECTOR, AND METHOD FOR DRIVING A DISCHARGE LAMP

This is a Continuation Application of application Ser. No. 13/313,385 filed Dec. 7, 2011. The disclosure of the prior application is hereby incorporate by reference herein in its entirety.

BACKGROUND

1. Technical Field

The present invention relates to discharge lamp driving devices, projectors, and methods for driving a discharge lamp.

2. Related Art

In the past, a projector that projects a picture onto a screen has had the technique of controlling the color balance or the brightness by driving a discharge lamp used in a light source of the projector by performing amplitude modulation on a drive current (hereinafter also referred to as a lamp current) of the discharge lamp. For example, there is a projector that performs time division on a white light emitted from the light source by using a color wheel including R (red), G (green), and B (blue) color filters, modulates the lights obtained by the time division into picture signals of these colors, and projects a picture. In such a projector, a method by which the color balance is controlled by driving the discharge lamp so that the lamp current thereof is increased during the interval that a light is passing through a predetermined color filter is proposed (for example, JP-A-2007-121971).

Moreover, projectors that project a three-dimensional (hereinafter also referred to as 3D) picture include a time-division 3D projector that alternately projects a picture for a right eye and a picture for a left eye by time division. The time-division 3D projector has shutter glasses that alternately open and close a liquid crystal shutter for a left eye and a liquid crystal shutter for a right eye in synchronization with the picture for a left eye and the picture for a right eye which are projected. The user can view 3D pictures by viewing the projected pictures through the shutter glasses. In this case, as a result of a picture in one frame being divided into two pictures: a picture for a left eye and a picture for a right eye by time division, the brightness of the picture for a left eye which is projected and the brightness of the picture for a right eye which is projected are reduced to half, and the picture that reaches the left eye and the picture that reaches the right eye become dark. Furthermore, when switching between the picture for a left eye and the picture for a right eye is performed, since a period in which the switching is performed includes a period in which control to close the liquid crystal shutter for a left eye and the liquid crystal shutter for a right eye at the same time is performed, the pictures that reach the eyes become even darker. To solve this problem, there is a method by which amplitude modulation is performed on the lamp current in such a way that the lamp current is increased in a period in which one of the liquid crystal shutter for a left eye and the liquid crystal shutter for a right eye is opened and the lamp current is decreased in a period in which both of the liquid crystal shutters are closed. By this method, it is possible to make the pictures that reach the eyes bright without increasing the average power of drive power (hereinafter also referred to as lamp power) of the discharge lamp.

However, since a drive voltage (hereinafter also referred to as a lamp voltage) of the discharge lamp has initial variations and a temporal change, even when the discharge lamp is driven in such a way that the average power which is supplied to the discharge lamp becomes constant, the lamp current increases when the lamp voltage decreases. Therefore, when the discharge lamp driving device performs amplitude modulation on the lamp current of the discharge lamp, even when the average current of the lamp current is less than or equal to the rated current, the lamp current may exceed the rated current in a period in which the lamp current is increased. In this case, heat generation in the discharge lamp driving device becomes a problem, and solving this problem undesirably necessitates an increase in the cost of the parts used in the discharge lamp driving device or an increase in the sizes of the parts.

SUMMARY

An advantage of some aspects of the invention is to provide a discharge lamp driving device, a projector, and a method for driving a discharge lamp, the device, the projector, and the method that can drive a discharge lamp by an appropriate lamp current when driving the discharge lamp by performing amplitude modulation on a lamp current.

An aspect of the invention is directed to a discharge lamp driving device including: a power supply section that controls a current of power to be supplied to a discharge lamp from input power, and outputs the current; a voltage detecting section that detects a drive voltage of the discharge lamp; and a control section that controls a modulation factor of a drive current on which amplitude modulation has been performed, the drive current which is supplied to the discharge lamp from the power supply section, in accordance with the detected drive voltage of the discharge lamp.

According to the aspect of the invention, the control section controls the modulation factor of the drive current which is supplied to the discharge lamp from the power supply section in accordance with the drive voltage of the discharge lamp. Therefore, when the discharge lamp driving device according to the aspect of the invention drives the discharge lamp by performing amplitude modulation on the drive current, the discharge lamp driving device can drive the discharge lamp by the drive current on which amplitude modulation has been performed by an appropriate modulation factor in accordance with the drive voltage of the discharge lamp.

In the discharge lamp driving device according to the aspect of the invention, the control section may control the modulation factor of the drive current which is supplied to the discharge lamp so as to be a low modulation factor in accordance with a decrease in the drive voltage of the discharge lamp.

According to this configuration, when the drive voltage of the discharge lamp decreases, the control section controls the modulation factor by which amplitude modulation is performed on the drive current which is supplied to the discharge lamp so as to be a low modulation factor in accordance with the decreased drive voltage. Therefore, when the discharge lamp driving device according to the aspect of the invention drives the discharge lamp by performing amplitude modulation on the drive current, the discharge lamp driving device can drive the discharge lamp by an appropriate drive current on which amplitude modulation has been performed by a low modulation factor in accordance with a decrease in the drive voltage of the discharge lamp.

In the discharge lamp driving device according to the aspect of the invention, the control section may control the modulation factor of the drive current which is supplied to the discharge lamp so as to be a predetermined modulation factor when the drive voltage of the discharge lamp is more than or equal to a predetermined threshold value, and control the modulation factor of the drive current which is supplied to the discharge lamp so as to be a modulation factor which is lower than the predetermined modulation factor in accordance with a decrease in the drive voltage of the discharge lamp when the drive voltage of the discharge lamp is less than the predetermined threshold value.

According to this configuration, the control section performs amplitude modulation on the drive current of the discharge lamp by a predetermined modulation factor, and, when the drive voltage of the discharge lamp decreases, the control section controls the modulation factor of the drive current which is supplied to the discharge lamp so as to be a modulation factor which is lower than the predetermined modulation factor in accordance with the decreased drive voltage. Therefore, when the discharge lamp driving device according to the aspect of the invention drives the discharge lamp by performing amplitude modulation on the drive current, the discharge lamp driving device can drive the discharge lamp by an appropriate drive current on which amplitude modulation has been performed by a low modulation factor in accordance with a decrease in the drive voltage of the discharge lamp.

The discharge lamp driving device according to the aspect of the invention may further include a current detecting section that detects a drive current of the discharge lamp, and, when the control section controls a modulation factor of a drive current which is supplied to the discharge lamp, the control section may perform control so that average power of drive power of the discharge lamp, the average power calculated based on the detected drive voltage and drive current of the discharge lamp, becomes constant.

According to this configuration, when the control section controls the modulation factor of the drive current which is supplied to the discharge lamp, the control section performs control so that the average power of the drive power becomes constant. Therefore, when the discharge lamp driving device according to the aspect of the invention drives the discharge lamp by performing amplitude modulation on the drive current, the discharge lamp driving device can drive the discharge lamp without increasing the average power of the drive power.

In the discharge lamp driving device according to the aspect of the invention, a modulation frequency of the drive current which is supplied to the discharge lamp may be a frequency synchronized with the frequency of a picture synchronizing signal which is input.

According to this configuration, the control section performs amplitude modulation on the drive current which is supplied to the discharge lamp by a frequency synchronized with the frequency of the picture synchronizing signal. Therefore, when the discharge lamp driving device according to the aspect of the invention drives the discharge lamp by performing amplitude modulation on the drive current, the discharge lamp driving device can control the brightness of the discharge lamp in synchronization with the frequency of the picture synchronizing signal.

In the discharge lamp driving device according to the aspect of the invention, the predetermined threshold value may be a voltage which is less than or equal to an initial drive voltage at the time of production of the discharge lamp.

According to this configuration, when the drive voltage of the discharge lamp decreases and becomes lower than an initial drive voltage at the time of production of the discharge lamp, the modulation factor of the drive current is controlled in accordance with a decrease in the drive voltage. Therefore, when the discharge lamp driving device according to the aspect of the invention drives the discharge lamp by performing amplitude modulation on the drive current, the discharge lamp driving device can drive the discharge lamp by an appropriate drive current when the drive voltage decreases and becomes lower than an initial drive voltage at the time of production of the discharge lamp due to a temporal change or the like.

Another aspect of the invention is directed to a projector including the discharge lamp driving device described above.

According to this aspect of the invention, it is possible to provide a projector that drives a discharge lamp, when driving the discharge lamp by performing amplitude modulation on a drive current, by a drive current on which amplitude modulation has been performed by an appropriate modulation factor in accordance with the drive voltage of the discharge lamp.

Still another aspect of the invention is directed to a projector including: the discharge lamp driving device described above; and a picture control section that performs control to perform switching a picture to be projected between a picture for a left eye and a picture for a right eye by time division and outputs a picture synchronizing signal synchronized with switching timing with which switching between the picture for a left eye and the picture for a right eye is performed, and the discharge lamp driving device performs amplitude modulation on a drive current which is supplied to the discharge lamp based on the picture synchronizing signal by using a frequency synchronized with the frequency of the picture synchronizing signal.

According to this aspect of the invention, the projector performs amplitude modulation on the drive current which is supplied to the discharge lamp in synchronization with the switching timing with which switching between the picture for a left eye and the picture for a right eye is performed, the pictures which are to be projected. Therefore, the projector according to this aspect of the invention can make pictures that reach the eyes bright without increasing the average power and drive the discharge lamp by an appropriate drive current even when the drive voltage of the discharge lamp decreases.

Yet another aspect of the invention is directed to a method for driving a discharge lamp including: allowing a power supply section to control a current of power to be supplied to a discharge lamp from input power, and output the current; allowing a voltage detecting section to detect a drive voltage of the discharge lamp; and allowing a control section to control a modulation factor of a drive current, which is supplied to the discharge lamp from the power supply section and whose amplitude has been modulated, in accordance with the detected drive voltage of the discharge lamp.

According to this aspect of the invention, the control section performs a process of controlling the modulation factor of the drive current which is supplied to the discharge lamp from the power supply section in accordance with the drive voltage of the discharge lamp. Therefore, by the method for driving a discharge lamp according to this aspect of the invention, when driving the discharge lamp by performing amplitude modulation on the lamp current, it is possible to drive the discharge lamp by a drive current on which amplitude modulation has been performed by an appropriate modulation factor in accordance with the drive voltage of the discharge lamp.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings. Incidentally, component elements in the following drawings are illustrated on different scales to make the component elements more visible.

Figure 1:
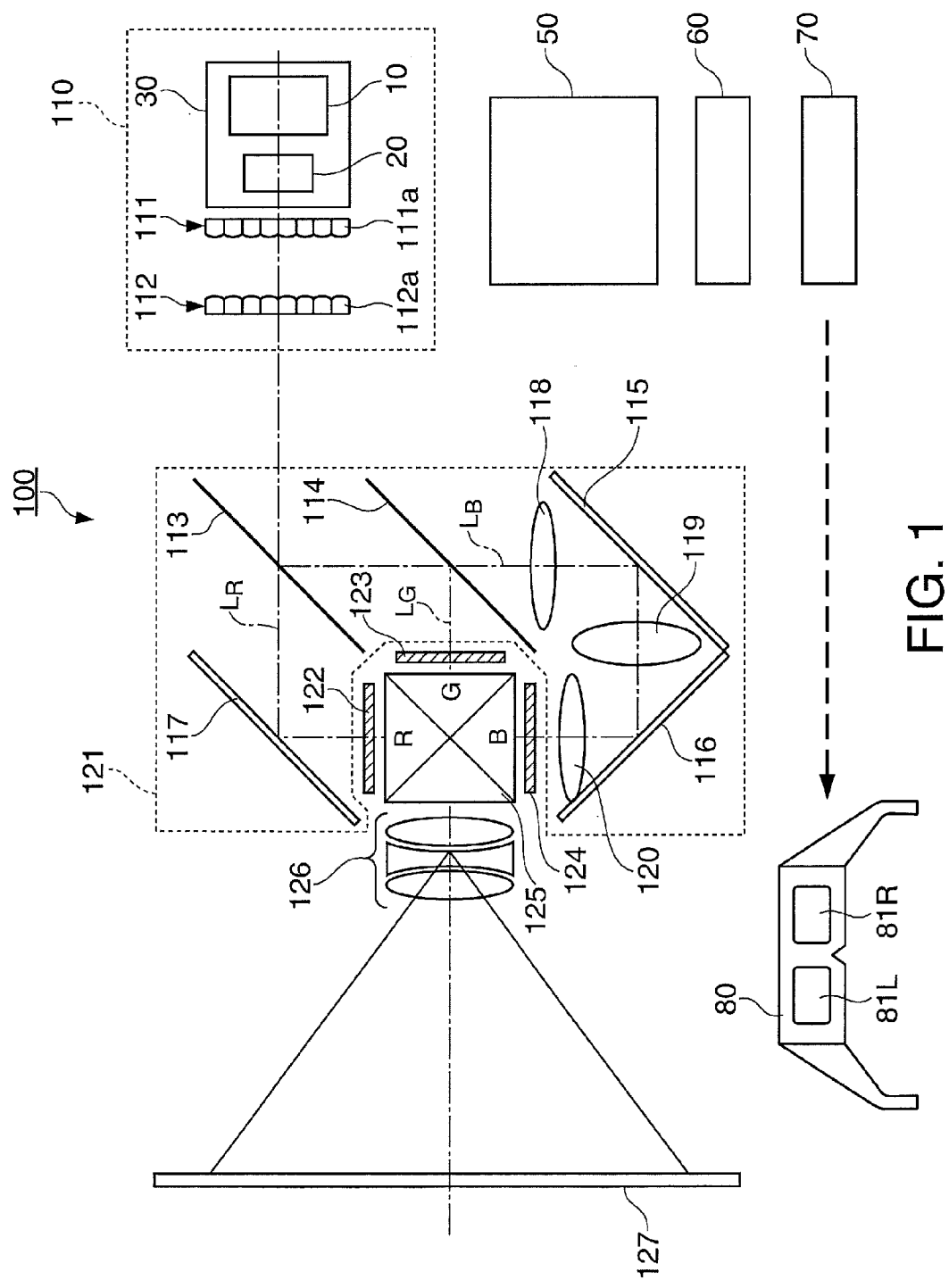
FIG. 1 is a schematic block diagram showing the configuration of a projector according to an embodiment of the invention.

FIG. 1 is a schematic block diagram showing an example of the configuration of a projector 100 according to an embodiment of the invention. The projector 100 shown in FIG. 1 is a time-division 3D projector that performs time division on each frame and projects, onto a screen 127, a picture for a left eye and a picture for a right eye alternately while performing switching between them and thereby allows the user to view a stereoscopic, three-dimensional (hereinafter 3D) picture by viewing the projected pictures through shutter glasses 80. The projector 100 includes an illuminating device 110, a color separation system 121, liquid crystal light valves 122 to 124, a cross dichroic prism 125, a projection system 126, a picture control section 50, a shutter glasses control section 60, a transmitting section 70, and the shutter glasses 80.

The illuminating device 110 includes a light source device 30, a first lens array 111, and a second lens array 112. Moreover, the first lens array 111 and the second lens array 112 include a plurality of lenses 111a and a plurality of lenses 112a, respectively. The illumination distribution of the light emitted from the light source device 30 is uniformized in the liquid crystal light valves 122 to 124, which are illuminated regions, as a result of the light passing through the first lens array 111 and the second lens array 112.

The color separation system 121 includes dichroic mirrors 113 and 114, reflection mirrors 115 to 117, and lenses 118 to 120. The color separation system 121 separates the light which enters the color separation system 121 from the illuminating device 110 into a red light LR, a green light LG, and a blue light LB, and makes the lights enter the liquid crystal light valves 122 to 124, respectively. The dichroic mirrors 113 and 114 are mirrors that selectively reflect a light in a predetermined wavelength range and transmit lights in other wavelength ranges, and are mirrors formed of dielectric multilayers stacked on a transparent substrate, for example. The dichroic mirror 113 transmits the red light LR of the lights from the illuminating device 110 and reflects the green light LG and the blue light LB. The dichroic mirror 114 transmits the blue light LB of the reflected green light LG and blue light LB and reflects the green light LG.

As a result, of the lights from the illuminating device 110, the red light LR is reflected from the reflection mirror 117 after passing through the dichroic mirror 113 and enters the liquid crystal light valve 122 for a red light. The green light LG is reflected from the dichroic mirror 114 after being reflected from the dichroic mirror 113 and enters the liquid crystal light valve 123 for a green light. The blue light LB is reflected from the dichroic mirror 113, passes through the dichroic mirror 114, and enters the liquid crystal light valve 124 for a blue light through the lens 118, the reflection mirror 115, the lens 119, the reflection mirror 116, and the lens 120.

The liquid crystal light valves 122 to 124 generate a red picture light, a green picture light, and a blue picture light by modulating, based on a picture signal input from the outside, the red light LR, the green light LG, and the blue light LB which have entered the liquid crystal light valves 122 to 124, and make the picture lights enter the cross dichroic prism 125.

The cross dichroic prism 125 combines the red picture light, the green picture light, and the blue picture light which have entered the cross dichroic prism 125 and thereby generates a color picture light. The cross dichroic prism 125 is formed of right-angle prisms bonded together and has, on the inner surfaces thereof, a mirror surface reflecting the red picture light and a mirror surface reflecting the blue picture light, the mirror surfaces being formed in the shape of a cross. As a result, the red picture light, the green picture light, and the blue picture light which have entered the cross dichroic prism 125 are combined through the mirror surfaces, whereby a color picture light is generated.

The projector 100 enlarges the generated color picture light and projects the color picture light onto the screen 127 through the projection system 126, and thereby projects a picture based on the input picture signal.

The picture control section 50 performs control so as to switch a picture to be projected between a picture for a left eye and a picture for a right eye alternately by time division based on the input picture signal. For example, the picture control section 50 divides one frame period into two ½ frame periods by time division, performs switching between a picture for a left eye and a picture for a right eye at intervals of ½ frame period, and outputs, to the liquid crystal light valves 122 to 124, a picture signal based on the picture for a left eye and the picture for a right eye between which switching is performed. The liquid crystal light valves 122 to 124 modulate the input picture signal based on the picture for a left eye and the picture for a right eye and generates a picture light. Then, the projector 100 enlarges the generated picture light and projects the picture light onto the screen 127 through the cross dichroic prism 125 and the projection system 126 and thereby projects the picture for a left eye and the picture for a right eye.

Moreover, the picture control section 50 outputs, to the light source device 30 and the shutter glasses control section 60, a picture synchronizing signal synchronized with switching timing with which switching between the picture for a left eye and the picture for a right eye is performed. Based on the input picture synchronizing signal, the shutter glasses control section 60 generates a control signal that controls opening and closing of a left-eye shutter 81L and a right-eye shutter 81R of the shutter glasses 80. For example, the shutter glasses control section 60 makes a left-eye shutter control signal take H (high) level when performing control to bring the left-eye shutter 81L into an open state, and makes the left-eye shutter control signal take L (low) level when performing control to bring the left-eye shutter 81L into a closed state. Furthermore, the shutter glasses control section 60 makes a right-eye shutter control signal take H (high) level when performing control to bring the right-eye shutter 81R into an open state, and makes the right-eye shutter control signal take L (low) level when performing control to bring the right-eye shutter 81R into a closed state. Then, the shutter glasses control section 60 transmits the left-eye shutter control signal and the right-eye shutter control signal to the shutter glasses 80 via the transmitting section 70 by wireless or wired transmission.

The shutter glasses 80 drive the left-eye shutter 81L and the right-eye shutter 81R so that the left-eye shutter 81L is opened or closed and the right-eye shutter 81R is opened or closed based on the left-eye shutter control signal and the right-eye shutter control signal which have been transmitted from the shutter glasses control section 60 via the transmitting section 70. For example, in the left-eye shutter 81L and the right-eye shutter 81R, a liquid crystal shutter is used as a shutter. In addition, as a result of a drive voltage which is applied to the liquid crystal shutter being controlled, switching between a state in which a light is allowed to pass through the liquid crystal shutter and a state in which a light is not allowed to pass through the liquid crystal shutter is performed.

As described above, based on the input picture signal, the projector 100 projects the picture for a left eye and the picture for a right eye onto the screen 127 while performing switching between the pictures. The user views only the picture for a left eye with a left eye and only the picture for a right eye with a right eye by viewing the projected pictures through the shutter glasses 80. In this way, by the projector 100, a 3D picture having a stereoscopic effect on the user is obtained.

Moreover, the light source device 30 includes a discharge lamp 20 and a discharge lamp driving device 10 that controls lighting of the discharge lamp 20 by driving the discharge lamp 20. The discharge lamp 20 is a high-pressure mercury lamp, a halogen lamp, or a metal halide lamp, for example.

Incidentally, it is desirable for the user to view a more bright picture projected on the screen 127. The brightness of the picture projected on the screen 127 by the projector 100 is increased with an increase in the amount of light emitted from the discharge lamp 20. However, since a picture in one frame is divided into a picture for a left eye and a picture for a right eye by time division to obtain a 3D picture in the projector 100 described above, the amount of light of the picture for a left eye and the amount of light of the picture for a right eye, the pictures that reach the eyes, are reduced, whereby the amounts of light of the pictures that reach the left eye and the right eye are reduced. Moreover, since, for example, the light transmittance of the liquid crystal shutter in the shutter glasses 80 is not 100%, the amounts of light that reaches the eyes are further reduced. Therefore, although a 3D picture is obtained by the projector 100, pictures that reach the eyes become dark with the same control as the control of the light source which is performed when a normal picture (a normal 2D picture which is formed only of pictures for both eyes and is viewed without the shutter glasses) is projected.

Moreover, when a 3D picture is projected, the projector 100 performs control so that both the left-eye shutter 81L and the right-eye shutter 81R of the shutter glasses 80 are in a closed state in a period (for example, a period in which the picture for a left eye and the picture for a right eye coexist) in which display of the picture is not stabilized due to switching between the picture for a left eye and the picture for a right eye. This control is one of the factors that make a period in which the picture reaches the eye even shorter and make the picture that reaches the eye dark. On the other hand, in a period in which both of the shutters are closed by this control, there is no need to increase the amount of light of the discharge lamp 20. Therefore, the discharge lamp driving device 10 drives the discharge lamp 20 in such a way that the amount of light of the discharge lamp 20 in a period in which both of the shutters are closed is reduced and the amount of light of the discharge lamp 20 in a period in which the left-eye shutter 81L or the right-eye shutter 81R is open is increased.

For example, based on the picture synchronizing signal input from the picture control section 50, the discharge lamp driving device 10 performs amplitude modulation on the lamp current which is supplied to the discharge lamp 20 by a predetermined modulation factor in synchronization with the frequency of the picture synchronizing signal. Specifically, the discharge lamp driving device 10 decreases the lamp current in a period in which both of the shutters of the shutter glasses 80 are closed and increases the lamp current in a period in which the left-eye shutter or the right-eye shutter is open. By doing so, when a 3D picture is projected, the projector 100 can make the pictures that reach the eyes bright without increasing the average lamp current flowing through the discharge lamp 20.

Next, the control to drive the discharge lamp 20 by performing amplitude modulation on the lamp current when the projector 100 projects a 3D picture will be described by using FIGS. 2A to 2D.

Figure 2:
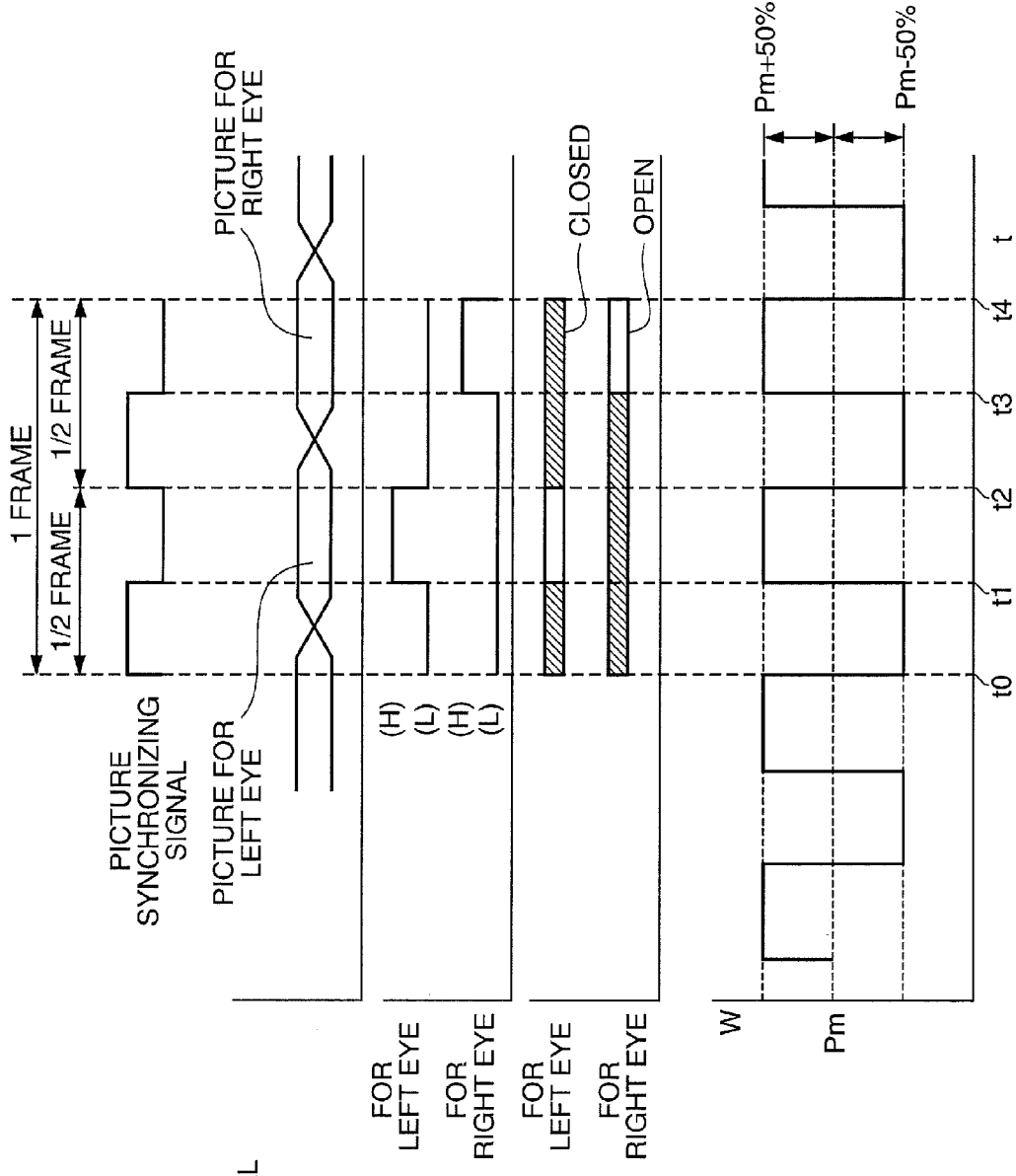
FIGS. 2A to 2D are timing charts showing the relationship between lamp power, a picture, and shutter glasses.

FIGS. 2A to 2D are timing charts showing the relationship between lamp power, a picture, and the shutter glasses 80 when amplitude modulation is performed on the lamp current in synchronization with the frequency of the picture synchronizing signal. Here, a description is given by taking up, as an example of the picture synchronizing signal, a picture synchronizing signal whose one period corresponds to ½ of one frame period of a picture, the picture synchronizing signal with which switching between the picture for a left eye and the picture for a right eye is started at the rising edge of the picture synchronizing signal and the switching between the pictures is completed at the falling edge of the picture synchronizing signal. Moreover, the horizontal axes of FIG. 2A to 2D represent time. FIG. 2A shows a state of a picture signal, FIG. 2B shows the signal level of a shutter control signal, FIG. 2C shows an open/closed state of the shutter, and FIG. 2D shows lamp power.

Incidentally, in the drawings, a case in which amplitude modulation is performed on the lamp current and the lamp power at a modulation factor of 50% is shown as an example.

A period from time t0 to time t4 of FIGS. 2A to 2D corresponds to a period of one frame of a picture. Moreover, a period from time t0 to time t2 and a period from time t2 to time t4 are periods obtained by dividing a period of one frame into two ½ frame periods by time division.

In a period from time t0 to time t1, the projector 100 switches a picture to be projected from the picture for a right eye to the picture for a left eye. In this period, the shutter glasses control section 60 performs control so that both the left-eye shutter 81L and the right-eye shutter 81R of the shutter glasses 80 are in a closed state by making the left-eye shutter control signal and the right-eye shutter control signal take L (low) level. Moreover, the discharge lamp driving device 10 drives the discharge lamp 20 by power obtained by reducing the lamp power of the discharge lamp 20 from rated power Pm by 50%.

Next, in a period from time t1 to time t2, the projector 100 projects the picture for a left eye as a picture to be projected. In this period, the shutter glasses control section 60 makes the left-eye shutter control signal take H (high) level and makes the right-eye shutter control signal take L (low) level. That is, the shutter glasses control section 60 performs control so that the left-eye shutter 81L of the shutter glasses 80 is in an open state and the right-eye shutter 81R is in a closed state. Moreover, the discharge lamp driving device 10 drives the discharge lamp 20 by power obtained by increasing the lamp power of the discharge lamp 20 from the rated power Pm by 50%.

Furthermore, in a period from time t2 to time t3, the projector 100 switches a picture to be projected from the picture for a left eye to the picture for a right eye. In this period, the shutter glasses control section 60 performs control so that both the left-eye shutter 81L and the right-eye shutter 81R of the shutter glasses 80 are in a closed state by making the left-eye shutter control signal and the right-eye shutter control signal take L (low) level. In addition, the discharge lamp driving device 10 drives the discharge lamp 20 by power obtained by reducing the lamp power of the discharge lamp 20 from the rated power Pm by 50%.

Then, in a period from time t3 to time t4, the projector 100 projects the picture for a right eye as a picture to be projected. In this period, the shutter glasses control section 60 makes the left-eye shutter control signal take L (low) level and makes the right-eye shutter control signal take H (high) level. That is, the shutter glasses control section 60 performs control so that the left-eye shutter 81L of the shutter glasses 80 is in a closed state and the right-eye shutter 81R is in an open state. Moreover, the discharge lamp driving device 10 drives the discharge lamp 20 by power obtained by increasing the lamp power of the discharge lamp 20 from the rated power Pm by 50%.

As described above, the projector 100 drives the discharge lamp 20 by lamp power obtained by increasing the lamp power from the rated power Pm by 50% in a period in which the picture for a left eye or the picture for a right eye is projected, and drives the discharge lamp 20 by lamp power obtained by reducing the lamp power from the rated power Pm by 50% in a period in which switching between the picture for a left eye and the picture for a right eye is performed. As a result, when a period with increased lamp power and a period with the reduced lamp power are equal in length, it is possible to make a picture to be projected bright without allowing the average lamp power to exceed the rated power Pm.

Incidentally, since the discharge lamp 20 is a constant voltage load, when an increase or reduction in the lamp power by which the discharge lamp 20 is driven is controlled, the discharge lamp driving device 10 performs the control by increasing or decreasing the lamp current of the discharge lamp 20. For example, when switching control by which the lamp power is increased or reduced by 50%, the switching control described by using FIGS. 2A to 2D, is performed, the discharge lamp driving device 10 performs control by which amplitude modulation is performed, by a modulation factor of 50%, on the lamp current which is supplied to the discharge lamp 20.

Figure 3:
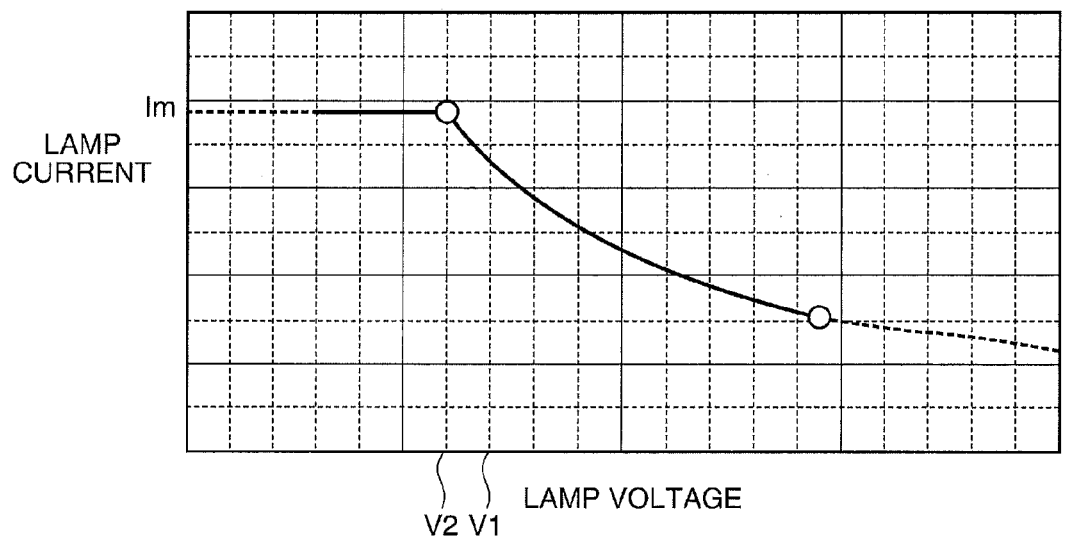
FIG. 3 is a waveform diagram showing the relationship between a lamp voltage and a lamp current when a discharge lamp is driven.

FIG. 3 is a waveform diagram showing the relationship between a lamp voltage and a lamp current when the discharge lamp 20 is driven. Moreover, the lamp current in this drawing shows a lamp current on which amplitude modulation is not performed. When a typical initial voltage (which is a center of production tolerance and an initial voltage after production) of the lamp voltage of the discharge lamp 20 is assumed to be a voltage V1, the lamp voltage sometimes becomes a voltage which is more than or less than the voltage V1 due to production tolerance, a temporal change, or the like. In this case, the discharge lamp driving device 10 performs control to drive the discharge lamp 20 by constant power so that the lamp power does not exceed the rated power Pm even when the lamp voltage varies. Moreover, when the discharge lamp driving device 10 drives the discharge lamp 20 by constant power to deal with variations in the lamp voltage and the lamp voltage is reduced to a voltage V2 at which the lamp current becomes a rated current Im, the discharge lamp driving device 10 performs control so that the lamp current does not exceed the rated current Im. That is, the discharge lamp driving device 10 performs control to limit the lamp current which is supplied to the discharge lamp 20 to the rated current Im when the lamp voltage is less than or equal to the voltage V2.

However, when amplitude modulation is performed on the lamp current which is supplied to the discharge lamp 20, as a result of constant power drive control of the lamp power being performed and the lamp current being limited to the rated current Im, there are cases in which, although the average lamp current is equal to a lamp current on which amplitude modulation is not performed and does not exceed the rated current, the lamp current on which amplitude modulation has been performed, the lamp current in a maximum amplitude period, exceeds the rated current. In the discharge lamp driving device 10, since heat generation increases in proportion to nearly the square of the lamp current, when the lamp current exceeds the rated current, the costs of the parts used in the discharge lamp driving device 10 or the sizes of the parts increase to deal with increased heat generation. That is, when amplitude modulation is performed on the lamp current which is supplied to the discharge lamp 20, heat generation caused by a decrease in the lamp voltage, which poses no problem when amplitude modulation is not performed on the lamp current, becomes a problem.

To solve this problem, the discharge lamp driving device 10 of this embodiment controls the modulation factor of the lamp current which is supplied to the discharge lamp 20 in accordance with the lamp voltage of the discharge lamp 20 when amplitude modulation is performed on the lamp current which is supplied to the discharge lamp 20.

Figure 4:
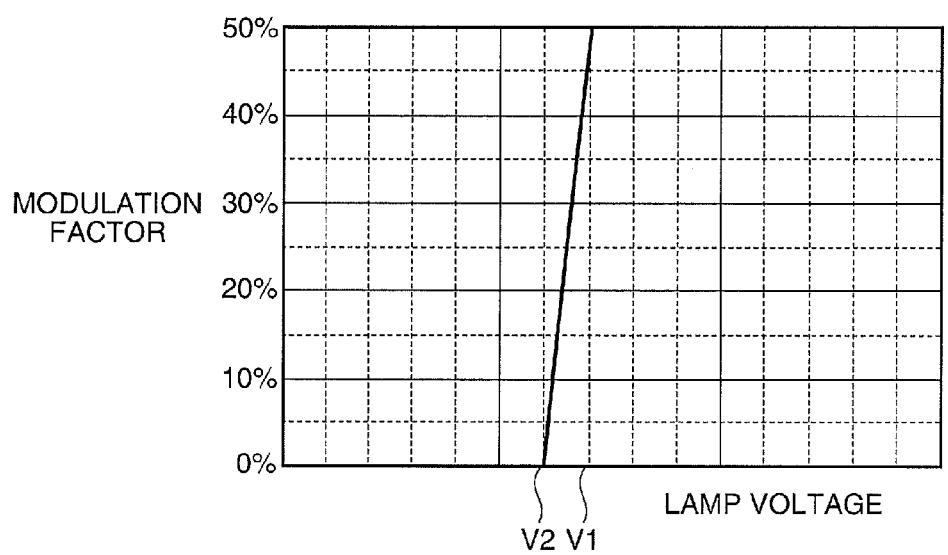
FIG. 4 is a waveform diagram showing the control of a modulation factor when amplitude modulation is performed on the lamp current.

FIG. 4 is a waveform diagram showing the control of a modulation factor when amplitude modulation is performed on the lamp current. The horizontal axis represents a lamp voltage, and the vertical axis represents a modulation factor. The control performed by the discharge lamp driving device 10 to control the modulation factor of the lamp current which is supplied to the discharge lamp 20 in accordance with the lamp voltage of the discharge lamp 20 will be described by using this drawing.

When the lamp voltage of the discharge lamp 20 is more than or equal to a predetermined threshold value, the discharge lamp driving device 10 controls the modulation factor of the lamp current which is supplied to the discharge lamp 20 so as to be a predetermined modulation factor. For example, when the predetermined threshold value of the lamp voltage of the discharge lamp 20 is set at a voltage V1 which is an initial voltage of the lamp voltage and the predetermined modulation factor is set at a modulation factor of 50%, the discharge lamp driving device 10 performs amplitude modulation on the lamp current by a modulation factor of 50% when the lamp voltage of the discharge lamp 20 is more than or equal to the voltage V1. Here, the initial voltage of the lamp voltage is an initial lamp voltage at the time of production of the discharge lamp 20. For example, the voltage V1 which is set as the predetermined threshold value of the lamp voltage of the discharge lamp 20 is an initial lamp voltage at the time of production of the discharge lamp 20 and a voltage which has been determined in advance based on a center value, a lower limit, or the like in production tolerance of each part of the discharge lamp 20.

Moreover, when the lamp voltage of the discharge lamp is less than the predetermined threshold value, the discharge lamp driving device 10 controls the modulation factor of the drive current which is supplied to the discharge lamp 20 so as to be a modulation factor which is lower than the predetermined modulation factor in accordance with the lamp voltage of the discharge lamp 20. For example, when the lamp voltage of the discharge lamp 20 is less than the voltage V1, the discharge lamp driving device 10 controls the modulation factor of the lamp current which is supplied to the discharge lamp 20 so as to be a modulation factor which is lower than a modulation factor of 50% in accordance with a decrease in the lamp voltage of the discharge lamp 20. Here, the modulation factor which is lower than a modulation factor of 50% is a modulation factor which has been determined in advance for a decrease in the lamp voltage and any modulation factor which is a modulation factor of 0% or more but less than 50%.

When the lamp voltage of the discharge lamp 20 becomes a voltage V2 or less, for example, the discharge lamp driving device 10 performs control so that the modulation factor becomes 0%, that is, performs control so that amplitude modulation is not performed. Incidentally, when the lamp voltage becomes less than the voltage V2, as described by using FIG. 3, the discharge lamp driving device 10 performs control so that the lamp current is limited to the rated current Im.

As described above, the projector 100 performs amplitude modulation on the lamp current at a frequency synchronized with the frequency of the picture synchronizing signal and supplies the lamp current to the discharge lamp 20. For example, the projector 100 increases the lamp current in a period in which the user views a projected picture through the shutter glasses, that is, in a period in which the shutter of the shutter glasses is in an open state, and decreases the lamp current in other periods. By doing so, the projector 100 can make the pictures that reach the eyes bright without increasing the average power of the lamp power. In addition, when the lamp voltage of the discharge lamp 20 becomes less than the initial voltage V1, the projector 100 reduces the modulation factor of the lamp current and performs amplitude modulation, whereby it is possible to prevent an increase in maximum amplitude of the lamp current in a period in which the shutter of the shutter glasses is in an open state. This makes it possible to suppress heat generation of individual sections in the projector 100 and prevent an increase in part cost or part size because there is no need to use apart that is resistant to generated heat. Therefore, when the projector 100 drives the discharge lamp 20 by performing amplitude modulation on the lamp current, the projector 100 can drive the discharge lamp 20 by an appropriate lamp current.

Next, the configuration of the discharge lamp driving device 10 and amplitude modulation control of the lamp current will be described in a concrete manner.

Figure 5:
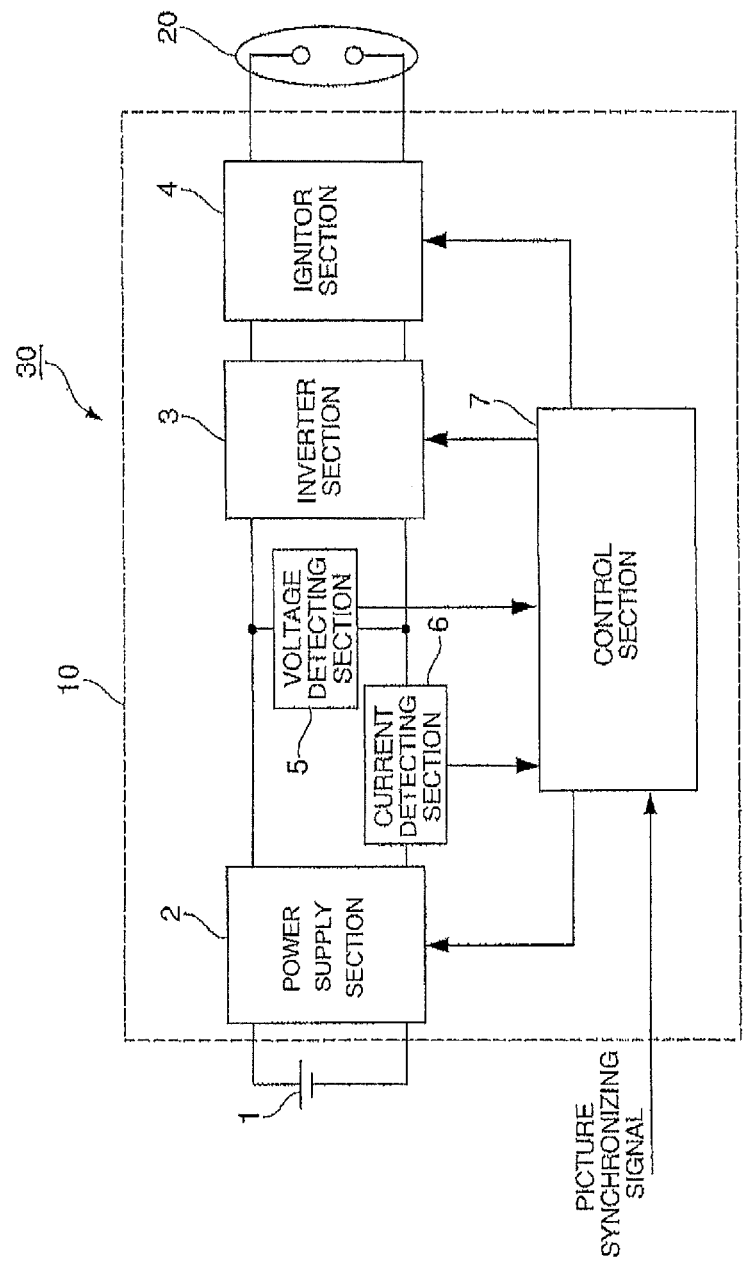
FIG. 5 is a schematic block diagram showing an example of the configuration of a discharge lamp driving device according to the embodiment.

FIG. 5 is a schematic block diagram showing an example of the configuration of the discharge lamp driving device 10 according to the embodiment of the invention. The discharge lamp driving device 10 includes an input power supply 1, a direct-current power supply section 2 (a power supply section), an inverter section 3, an ignitor section 4, a voltage detecting section 5, a current detecting section 6, and a control section 7, and drives the discharge lamp 20.

The input power supply 1 is a power supply that supplies direct-current power and may be, for example, a power supply obtained by rectifying and smoothing a commercial alternating-current power supply for household use and converting it into a direct-current power supply, a direct-current power supply device, a battery, or the like. The direct-current power supply section 2 is a down-converter, for example. The direct-current power supply section 2 controls the current of power to be supplied to the discharge lamp 20, the power of the direct-current power input from the input power supply 1, and outputs the current to the inverter section 3. Moreover, the direct-current power supply section 2 adjusts the voltage of the direct-current power input from the input power supply 1 to become a lamp voltage for driving the discharge lamp 20.

Furthermore, the voltage detecting section 5 is connected in parallel to an output end of the direct-current power supply section 2. The voltage detecting section 5 detects a lamp voltage of the discharge lamp 20. For example, the voltage detecting section 5 detects an output voltage of the direct-current power supply section 2 as a lamp voltage, and outputs the detection result to the control section 7. Moreover, the current detecting section 6 is connected in series with a power line on the negative supply side of the output of the direct-current power supply section 2. The current detecting section 6 detects a current flowing through the power line as a lamp current, and outputs the detection result to the control section 7.

The inverter section 3 includes four switching elements connected to one another in a full-bridge connection, for example, and converts a direct current input from the direct-current power supply section 2 into an alternating current by alternately switching on and off of two pairs of switching elements, one pair being formed of two of the four switching elements and the other pair being formed of the other two of the four switching elements. Then, the inverter section 3 outputs the alternating current obtained by conversion to the ignitor section 4 as a lamp current which is supplied to the discharge lamp 20. Moreover, the inverter section 3 converts a direct current into an alternating current as a result of the above-described switching elements being controlled by a control signal output from the control section 7.

The ignitor section 4 includes an ignitor transformer and a driver circuit for the ignitor transformer, for example. The ignitor section 4 generates a high-voltage pulse at the start of the discharge lamp 20 under control of the control section 7 and applies the high-voltage pulse to the discharge lamp 20. Moreover, the ignitor section 4 supplies the alternating current input from the inverter section 3 to the discharge lamp 20 after the discharge lamp 20 is started, and makes the discharge lamp 20 stay on.

The control section 7 calculates lamp power which is supplied to the discharge lamp 20 based on the lamp voltage detected by the voltage detecting section 5 and the lamp current detected by the current detecting section 6. Then, the control section 7 makes the direct-current power supply section 2 control the direct current which is output from the direct-current power supply section 2 so that the calculated lamp power becomes target power (the rated power Pm of the discharge lamp 20 or lamp power less than or equal to the rated power Pm which is a target determined in advance to be supplied to the discharge lamp 20).

Moreover, the control section 7 controls the modulation factor of the lamp current on which amplitude modulation has been performed, the lamp current which is supplied to the discharge lamp 20 from the direct-current power supply section 2, in accordance with the lamp voltage of the discharge lamp 20, the lamp voltage detected by the voltage detecting section 5. For example, the control section 7 controls the modulation factor of the lamp current which is supplied to the discharge lamp 20 so as to be a low modulation factor in accordance with a decrease in the lamp voltage of the discharge lamp 20.

Specifically, when the detected lamp voltage of the discharge lamp 20 is more than or equal to a predetermined threshold value (for example, the voltage V1), the control section 7 controls the modulation factor of the lamp current which is supplied to the discharge lamp 20 so as to be a predetermined modulation factor (for example, a modulation factor of 50%). Moreover, when the detected lamp voltage of the discharge lamp 20 is less than a predetermined threshold value (for example, the voltage V1), the control section 7 controls the modulation factor of the lamp current which is supplied to the discharge lamp 20 so as to be a modulation factor which is lower than a predetermined modulation factor (for example, a modulation factor of 50%) in accordance with a decrease in the lamp voltage of the discharge lamp 20. When the control section 7 controls the modulation factor of the lamp current which is supplied to the discharge lamp 20, the control section 7 controls the direct current which is output from the direct-current power supply section 2 by controlling the direct-current power supply section 2.

Moreover, when the control section 7 controls the modulation factor of the lamp current which is supplied to the discharge lamp 20, the control section 7 performs control so that the average power of the lamp power which is supplied to the discharge lamp 20, the lamp power calculated based on the detected lamp voltage and the detected lamp current of the discharge lamp 20, becomes constant power, that is, the target power. In this way, when the control section 7 performs amplitude modulation by controlling the modulation factor of the lamp current, the control section 7 performs control so that the average power does not exceed the rated power Pm.

Furthermore, the modulation frequency of the drive current which is supplied to the discharge lamp 20 is a frequency synchronized with the frequency of the input picture synchronizing signal. For example, the control section 7 synchronizes the modulation frequency of the lamp current which is supplied to the discharge lamp 20 with the frequency of the input picture synchronizing signal. Specifically, as described by using FIG. 1, the picture control section 50 of the projector 100 outputs a picture synchronizing signal to the discharge lamp driving device 10. Then, the control section 7 controls the amplitude modulation of the lamp current in synchronization with the timing with which switching between the picture for a left eye and the picture for a right eye which are projected by the projector 100 is performed or the timing with which the shutters of the shutter glasses 80 are opened and closed by synchronizing the frequency of the picture synchronizing signal input from the picture control section 50 with the frequency of amplitude modulation of the lamp current.

FIGS. 6A to 6E are waveform diagrams showing the output states of the individual sections when amplitude modulation is performed on the lamp current in the discharge lamp driving device 10.

What are shown under (1) of FIGS. 6A to 6E are a lamp voltage (a waveform shown in FIG. 6A), an output current of the direct-current power supply section 2 (a waveform shown in FIG. 6B), an inverter waveform (a waveform shown in FIG. 6C), an output current of the inverter section 3 (a waveform shown in FIG. 6D), and lamp power (a waveform shown in FIG. 6E) when a lamp current is supplied to the discharge lamp 20 after amplitude modulation is performed on the lamp current. Moreover, what are shown under (2) of FIGS. 6A to 6E are the waveforms when a lamp current is supplied to the discharge lamp without amplitude modulation, the waveforms shown as comparative examples of those shown under (1) of FIGS. 6A to 6E.

Figure 6:
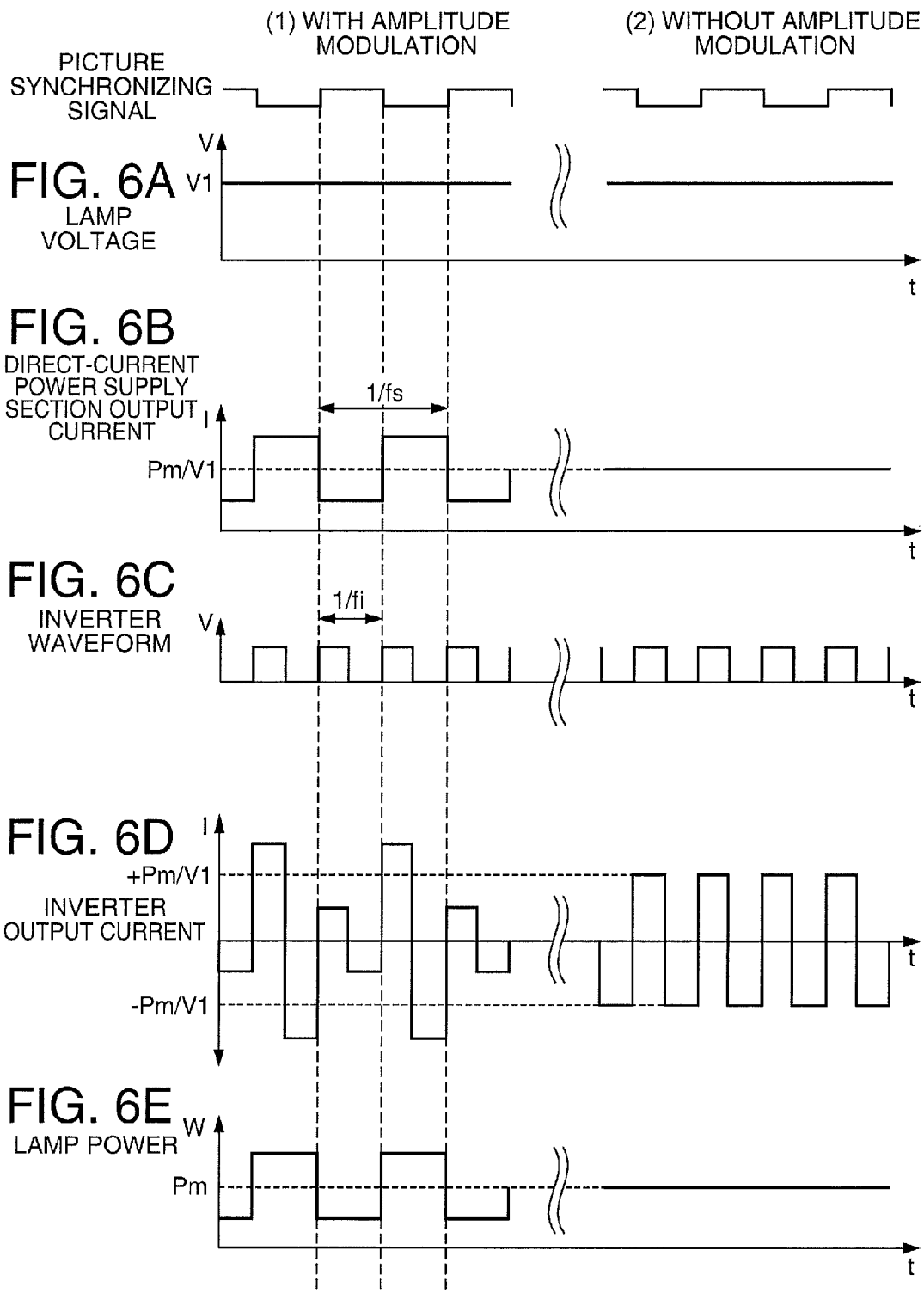
FIGS. 6A to 6E are waveform diagrams showing the output states of the individual sections when amplitude modulation is performed on the lamp current.

FIG. 6A shows a case in which the lamp voltage is the voltage V1. FIG. 6B shows a waveform of a current which the direct-current power supply section 2 outputs as a result of being controlled by the control section 7. When amplitude modulation is not performed on the lamp current, the direct-current power supply section 2 outputs a current given by "the rated power Pm/the voltage V1". On the other hand, when amplitude modulation is performed on the lamp current, the direct-current power supply section 2 performs amplitude modulation on a current given by "the rated power Pm/the voltage V1" and outputs the current. Incidentally, the value of the output current described above is a value obtained when the target power which is supplied to the discharge lamp 20 is set at the rated power Pm. Moreover, a case is shown in which the control section 7 performs control so that amplitude modulation is performed on the output current of the direct-current power supply section 2 by using a frequency fs synchronized with the frequency of the input picture synchronizing signal.

FIG. 6C shows a control signal (an inverter waveform) by which the control section 7 controls the inverter section 3. In this drawing, a case in which the inverter frequency is a frequency fi that is twice the frequency fs is shown. The inverter section 3 converts the current of the current waveform shown in FIG. 6A into an alternating current by this inverter frequency and outputs the alternating current. That is, an output current waveform of the inverter section 3 is a waveform shown in FIG. 6D. When amplitude modulation is not performed on the lamp current, the inverter section 3 outputs an alternating current with equal amplitude. On the other hand, when amplitude modulation is performed on the lamp current, the inverter section 3 outputs an alternating current whose amplitude is different per period of the inverter frequency (the frequency fi).

FIG. 6E shows lamp power which is supplied to the discharge lamp 20. When amplitude modulation is not performed on the lamp current, the lamp power which is supplied to the discharge lamp 20 is rated power Pm. On the other hand, when amplitude modulation is performed on the lamp current, the lamp power which is supplied to the discharge lamp 20 is the rated power Pm on which amplitude modulation has been performed by using the frequency fs.

Figure 7:
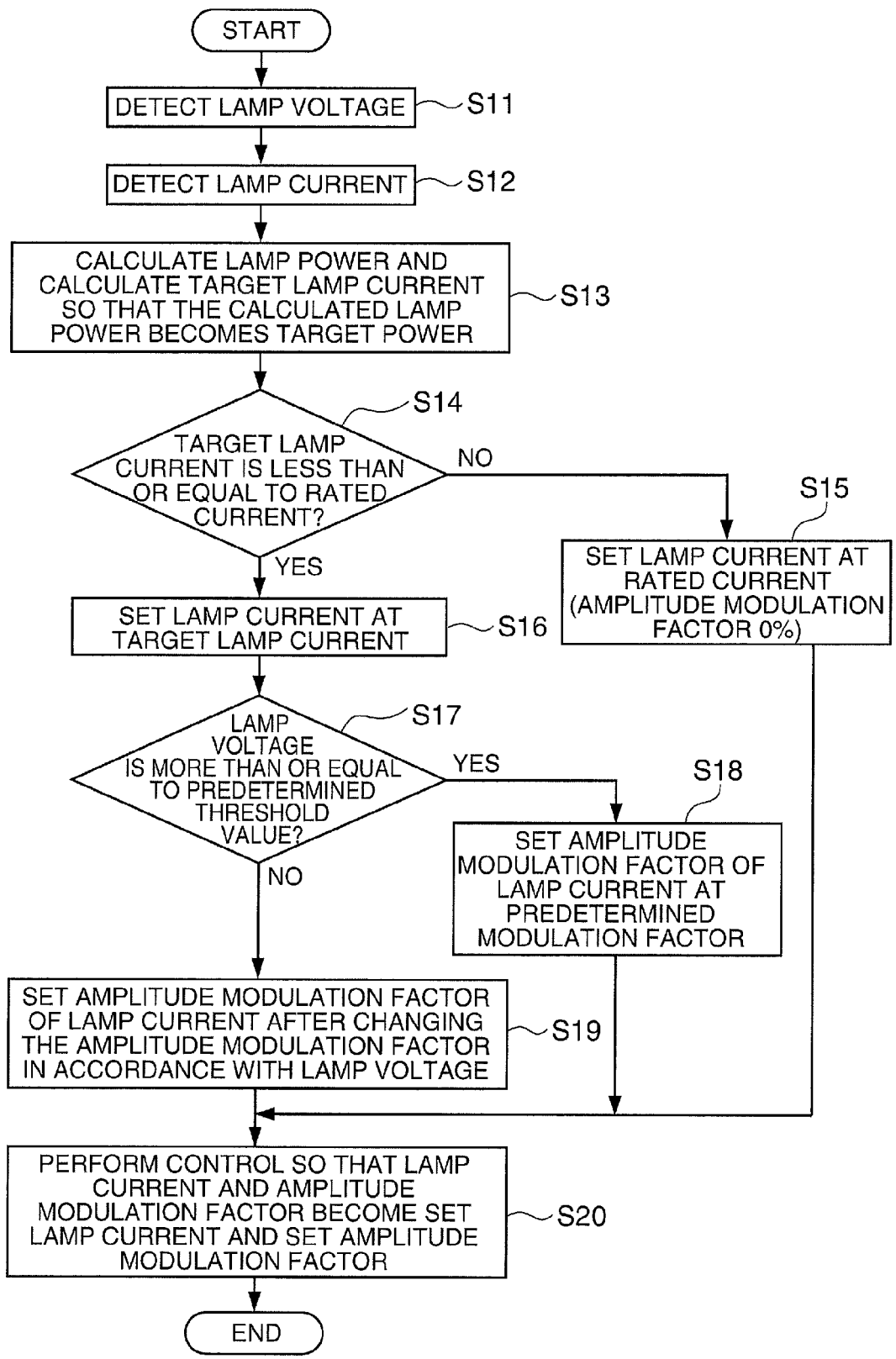
FIG. 7 is a flowchart showing the control of an amplitude modulation factor of the lamp current.

FIG. 7 is a flowchart showing the control of an amplitude modulation factor of the lamp current. Hereinafter, operation to control an amplitude modulation factor of the lamp current in the discharge lamp driving device 10 will be described by using FIG. 7.

The discharge lamp 20 has been started and turned on by the discharge lamp driving device 10. First, the voltage detecting section 5 of the discharge lamp driving device 10 detects the lamp voltage of the discharge lamp 20 and outputs the detection result to the control section 7 (step S11). Moreover, the current detecting section 6 detects a current flowing through a power line on the negative supply side of the output of the direct-current power supply section 2 as a lamp current, and outputs the detection result to the control section 7 (step S12).

Next, the control section 7 calculates the lamp power of the discharge lamp 20 based on the lamp voltage detected by the voltage detecting section 5 and the lamp current detected by the current detecting section 6. Then, the control section 7 compares the calculated lamp power with previously determined target power, and calculates a target lamp current in such a way that the calculated lamp power becomes the target power (step S13).

Next, the control section 7 determines whether or not the calculated target lamp current is less than or equal to the rated current Im (step S14). If it is determined in step S14 that the calculated target lamp current is not less than or equal to the rated current Im, the control section 7 makes settings so that the modulation factor of the lamp current becomes 0%, that is, amplitude modulation is not performed, sets the lamp current which is controlled by the direct-current power supply section 2 at the rated current Im (step S15), and proceeds to step S20.

On the other hand, if it is determined in step S14 that the calculated target lamp current is less than or equal to the rated current Im, the control section 7 sets the lamp current which is controlled by the direct-current power supply section 2 at the target lamp current calculated in step S13 (step S16).

Next, the control section 7 determines whether or not the lamp voltage detected by the voltage detecting section 5 is more than or equal to a predetermined threshold value (for example, a voltage V1) (step S17). If it is determined in step S17 that the lamp voltage is more than or equal to the predetermined threshold value (for example, the voltage V1), the control section 7 sets the amplitude modulation factor of the lamp current at a predetermined modulation factor (for example, a modulation factor of 50%) (step S18) and proceeds to step S20.

On the other hand, if it is determined in step S17 that the lamp voltage is not more than or equal to the predetermined threshold value (for example, the voltage V1), the control section 7 sets the amplitude modulation factor of the lamp current at a modulation factor which is lower than the predetermined modulation factor (for example, a modulation factor of 50%) in accordance with a decrease in the lamp voltage. For example, the control section 7 sets the amplitude modulation factor of the lamp current at a modulation factor (for example, a modulation factor which has been determined in advance for a decrease in the lamp voltage and any modulation factor which is a modulation factor of 0% or more but less than 50%) which is lower than the predetermined modulation factor (for example, a modulation factor of 50%) in accordance with the lamp voltage that has become less than or equal to the predetermined threshold value (for example, the voltage V1) (step S19). Then, the control section 7 proceeds to step S20.

Then, the control section 7 controls the direct-current power supply section 2 so that the lamp current and the amplitude modulation factor of the lamp current become the set lamp current and the set amplitude modulation factor of the lamp current based on the target lamp current and the amplitude modulation factor of the lamp current which are set in step S15, S16, S18, or S19 (step S20). In this way, the direct-current power supply section 2 controls the output current of the direct-current power supply section 2 so that the lamp current and the amplitude modulation factor of the lamp current become the set lamp current and the set amplitude modulation factor of the lamp current by the control of the control section 7.

As described above, when the lamp current exceeds the rated current Im due to a decrease in the lamp voltage when the discharge lamp driving device 10 drives the discharge lamp at constant power so that the lamp power becomes target power, the discharge lamp driving device 10 performs control to limit the lamp current to the rated current Im so that the lamp current does not exceed the rated current Im. Moreover, when the lamp voltage is more than or equal to a predetermined threshold value, the discharge lamp driving device 10 controls the lamp current so as to be a lamp current at which the lamp power becomes the target power, and performs control so that amplitude modulation is performed on the lamp current by a predetermined modulation factor (for example, a modulation factor of 50%). On the other hand, when the lamp voltage is not more than or equal to the predetermined threshold value, the discharge lamp driving device 10 controls the lamp current so as to be a lamp current at which the lamp power becomes the target power, and performs control so that amplitude modulation is performed on the lamp current by a modulation factor which is lower than the predetermined modulation factor (for example, a modulation factor of 50%).

As described above, according to this embodiment, the discharge lamp driving device 10 performs amplitude modulation on the lamp current, and, when there is a decrease in the lamp voltage, performs amplitude modulation by lowering the modulation factor of the lamp current in accordance with a decrease in the lamp voltage. As a result, the discharge lamp driving device 10 can prevent an increase in the maximum amplitude of the lamp current by increasing the amount of light of the discharge lamp 20 in a period in which the amplitude of the lamp current which is supplied to the discharge lamp 20 becomes maximum and controlling the modulation factor so as to be low when there is a decrease in the lamp voltage. In addition, since heat generation is curbed by preventing an increase in the maximum amplitude of the lamp current, the discharge lamp driving device 10 does not need to use a part that is resistant to generated heat. Therefore, the discharge lamp driving device 10 can prevent an increase in part cost or part size. This allows the discharge lamp driving device 10 to drive the discharge lamp 20 by an appropriate lamp current when driving the discharge lamp 20 by performing amplitude modulation on the lamp current.

Moreover, when there is a decrease in the lamp voltage of the discharge lamp 20 and the discharge lamp 20 is driven by the same lamp power as the lamp power observed before the lamp voltage decreases, although the amount of light that is output from the discharge lamp 20 is the same as the amount of light of the discharge lamp 20 before the lamp voltage decreases, the light use efficiency (light collecting efficiency) in the optical system of the projector 100 increases. The reason is as follows. When there is a decrease in the lamp voltage of the discharge lamp 20, the discharge lamp 20 becomes a smaller point source because the arc length in the discharge lamp 20 becomes shorter than the arc length observed before the lamp voltage decreases. Therefore, by controlling the modulation factor so as to be low in accordance with a decrease in the lamp voltage, the discharge lamp driving device 10 can maintain the amount of light without reducing the amount of light that reaches the eyes even when an increase in the maximum amplitude of the lamp current is prevented.

As a result, the discharge lamp driving device 10 can prevent an increase in the maximum amplitude of the lamp current by increasing the amount of light of the discharge lamp 20 in a period in which the amplitude of the lamp current becomes maximum by modulating the lamp current which is supplied to the discharge lamp 20 and controlling the modulation factor so as to be low while maintaining the amount of light when the lamp voltage decreases.

Incidentally, in the embodiment described above, a case in which a period in which the shutter of the shutter glasses 80 is open and a period in which the shutters are closed are equal in length has been described; however, the period in which the shutter of the shutter glasses 80 is open and the period in which the shutters are closed may have different lengths. When these periods have different lengths, the discharge lamp driving device 10 may control the amplitude of the lamp current in each period by setting the amplitude modulation factor in a period in which the current increases and the amplitude modulation factor in a period in which the current decreases at different modulation factors so that the average power becomes the same as the average power obtained when modulation is not performed.

Moreover, in the embodiment described above, a case in which the discharge lamp driving device 10 performs control so that the lamp power observed before amplitude modulation is performed on the lamp current becomes the same as the lamp power observed after amplitude modulation is performed on the lamp current has been described; however, the invention is not limited thereto. For example, the discharge lamp driving device 10 may perform control so that the lamp power observed after amplitude modulation is performed on the lamp current becomes smaller than the lamp power observed before amplitude modulation is performed on the lamp current. Furthermore, the discharge lamp driving device 10 may perform control so as to increase the lamp power observed after amplitude modulation is performed on the lamp current within the range of allowable power based on the conditions of the discharge lamp 20 and the driver circuit of the discharge lamp driving device 10.

In addition, in the embodiment described above, a case has been described in which the discharge lamp driving device 10 sets a predetermined modulation factor used when amplitude modulation is performed on the lamp current at 50% and controls the modulation factor so as to be changed from 50% to 0% in accordance with a decrease in the lamp voltage. These modulation factors are examples, and control by which amplitude modulation is performed on the lamp current by using other modulation factors may be performed.

Moreover, in the embodiment described above, a case has been described in which, when the discharge lamp driving device 10 drives the discharge lamp 20 by constant power to deal with variations in the lamp voltage and the lamp voltage is reduced to the voltage V2 at which the lamp current becomes the rated current Im, the discharge lamp driving device 10 performs control so that the lamp current does not exceed the rated current Im. In this case, a limit value of the lamp current is not limited to the rated current Im; the limit value of the lamp current may be an allowable maximum current value based on the conditions of the discharge lamp 20 and the driver circuit of the discharge lamp driving device 10 or any current value which has been determined in advance.

Furthermore, in the embodiment described above, a case in which the inverter frequency of the inverter section 3 controlled by the control section 7 is the frequency fi which is twice the frequency fs of the amplitude modulation performed on the lamp current has been described as an example; however, the inverter frequency may be a frequency other than the frequency fi which is twice the frequency fs.

In addition, in the embodiment described above, a case has been described in which the voltage detecting section 5 and the current detecting section 6 are connected to the output end of the direct-current power supply section 2 and detect an output voltage of the direct-current power supply section 2 and a current flowing through a power line on the negative supply side of the direct-current power supply section 2 as a lamp voltage and a lamp current, respectively. However, the point to which the voltage detecting section 5 and the current detecting section 6 are connected is not limited to the above point. For example, the voltage detecting section 5 may detect the lamp voltage by being connected in parallel to an output terminal of the ignitor section 4, and the current detecting section 6 may detect the lamp voltage and the lamp current by being connected in series with a power line connected to the discharge lamp 20.

Moreover, in the embodiment described above, a time division 3D projector has been described as the projector 100 provided with the discharge lamp driving device 10; however, the projector 100 is not limited to the time division 3D projector. For example, the projector 100 provided with the discharge lamp driving device 10 may be a projector that performs time division on a white light emitted from a light source by using a color wheel including a plurality of color filters, modulates the light subjected to time division into picture signals of the colors of the color filters, and then projects a picture. Furthermore, the projector 100 may be a projection television or a display device such as a motion picture projector.

Incidentally, the control section 7 in this embodiment may be realized by dedicated hardware or may be formed of memory and a CPU (central processing unit) and realize the functions of the individual sections of the control section 7 described above by loading a program product for realizing the functions into the memory and executing the program product.

Moreover, the processing of the individual sections of the control section 7 may be performed by storing, in a computer-readable recording medium, a program product for realizing the functions of the individual sections of the control section 7, making a computer system read the program product recorded in the recording medium, and executing the program product. Incidentally, the "computer system" here is assumed to include an OS and hardware such as peripheral devices.

Furthermore, when a WWW system is used, the "computer system" is assumed to include also an environment in which a home page is offered (or displayed).

In addition, the "computer-readable recording medium" refers to a portable medium such as a flexible disk, an magneto-optical disk, ROM, and a CD-ROM and storage such as a hard disk built into the computer system. Furthermore, the "computer-readable recording medium" is assumed to include also what dynamically retains a program product for a short period of time, such as a communication wire used when a program product is transmitted via a network such as the Internet and a communication line such as a telephone line, and what retains the program product for a given length of time, such as volatile memory which is provided inside a computer system which serves as a server or a client in that case. In addition, the program product described above may be a program product for realizing part of the functions described above and may be a program product that can realize the functions described above by being combined with a program product recorded in the computer system.

While the embodiment of the invention has been described in detail with reference to the drawings, a specific configuration is not limited to the embodiment and also includes a design etc. developed without departing from the spirit of the invention.

The entire disclosure of Japanese Patent Application No. 2011-002939, filed Jan. 11, 2011 is expressly incorporated by reference herein.

What is claimed is:

1. A discharge lamp driving device comprising:
   a power supply section that outputs a drive current supplied to a discharge lamp;
   a voltage detecting section that detects a drive voltage of the discharge lamp; and
   a control section that modulates amplitude of the drive current which is supplied to the discharge lamp in accordance with a detected drive voltage of the discharge lamp,
   wherein, after an actual start-up of the discharge lamp is completed and an operation of the discharge lamp has started, when the detected drive voltage is equal to or lower than a predetermined value, the control section does not modulate the amplitude of the drive current.

2. The discharge lamp driving device according to claim 1, wherein
   when the detected drive voltage is higher than the predetermined value, the control section modulates the amplitude of the drive current.

3. The discharge lamp driving device according to claim 1, wherein
   when the detected drive voltage is higher than the predetermined value, the control section decreases a modulation factor of the drive current which is supplied to the discharge lamp in accordance with a decrease in the drive voltage of the discharge lamp.

4. The discharge lamp driving device according to claim 1, wherein
   when the detected drive voltage is equal to or higher than a predetermined threshold value which is higher than the predetermined value, the control section controls a modulation factor of the amplitude of the drive current which is supplied to the discharge lamp so as to be a predetermined modulation factor.

5. The discharge lamp driving device according to claim 4, wherein
   when the detected drive voltage is higher than the predetermined value and is lower than the predetermined threshold value, the control section decreases the modulation factor of the drive current which is supplied to the discharge lamp in accordance with a decrease in the drive voltage of the discharge lamp, the modulation factor being lower than the predetermined modulation factor.

6. The discharge lamp driving device according to claim 4, wherein
   the predetermined threshold value is a drive voltage which is lower than or equal to an initial drive voltage at the time of production of the discharge lamp.

7. The discharge lamp driving device according to claim 1, wherein
   the predetermined value is a drive voltage at a time which the drive current is an allowable maximum current value on the discharge lamp driving device on a predetermined drive power supplied to the discharge lamp.

8. The discharge lamp driving device according to claim 1, wherein
   the predetermined value is a drive voltage at a time which the drive current is a rated current value on a predetermined drive power supplied to the discharge lamp.

9. The discharge lamp driving device according to claim 1, further comprising:
   a current detecting section that detects a drive current of the discharge lamp,
   wherein the control section controls a modulation factor of the amplitude of the drive current such that average power of drive power of the discharge lamp becomes constant, the average power calculated based on the detected drive voltage and a detected drive current of the discharge lamp.

10. The discharge lamp driving device according to claim 1, wherein
    a modulation frequency of the amplitude of the drive current is a frequency synchronized with a frequency of a picture synchronizing signal which is input.

11. A projector comprising:
    the discharge lamp driving device according to claim 1.

12. A projector comprising:
    the discharge lamp driving device according to claim 1; and
    a picture control section that performs switching a picture to be projected between a picture for a left eye and a picture for a right eye by time division and outputs a picture synchronizing signal synchronized with switching timing with which switching between the picture for a left eye and the picture for a right eye is performed,
    wherein the control section modulates the amplitude of the drive current based on the picture synchronizing signal at a frequency synchronized with a frequency of the picture synchronizing signal.

13. The discharge lamp driving device according to claim 1, wherein
    when the detected drive voltage of the discharge lamp is equal to or more than a second predetermined value, the control section modulates the amplitude of the drive current at a predetermined modulation rate,
    when the detected drive voltage of the discharge lamp is less than the second predetermined value, the control section modulates the amplitude of the drive current at a rate which is lower than the predetermined rate in accordance with the detected drive voltage of the discharge lamp, and
    when the detected drive voltage is equal to or lower than the predetermined value, the control section does not modulate the amplitude of the drive current.

14. The discharge lamp driving device according to claim 1, wherein the control section periodically changes the amplitude of the drive current supplied to the discharge lamp when the detected drive voltage is higher than the predetermined value.

15. The discharge lamp driving device according to claim 1, wherein
the control section periodically changes amplitude of a drive power supplied to the discharge lamp when the detected drive voltage is higher than the predetermined value.

16. A method for supplying a drive current to a discharge lamp and driving the discharge lamp comprising:
detecting a drive voltage of the discharge lamp; and
modulating amplitude of the drive current supplied to the discharge lamp in accordance with a detected drive voltage of the discharge lamp,
wherein, after an actual start-up of the discharge lamp is completed and an operation of the discharge lamp has started, when the detected drive voltage is equal to or lower than a predetermined value, the amplitude of the drive current is not modulated.

* * * * *